United States Patent [19]

Johnstone et al.

[11] Patent Number: 4,462,080
[45] Date of Patent: Jul. 24, 1984

[54] VOICE ACTUATED MACHINE CONTROL

[75] Inventors: Richard Johnstone; Edward E. Kirkham, both of Brookfield, Wis.

[73] Assignee: Kearney & Trecker Corporation, West Allis, Wis.

[21] Appl. No.: 325,325

[22] Filed: Nov. 27, 1981

[51] Int. Cl.³ ............................ G10L 1/00; G06F 3/00
[52] U.S. Cl. .................................. 364/513.5; 364/900; 381/110
[58] Field of Search ............... 381/43, 53, 110; 179/2 DP; 343/6.5 R; 364/513.5

[56] References Cited

U.S. PATENT DOCUMENTS

| | | | |
|---|---|---|---|
| 3,270,216 | 8/1966 | Dersch | 307/117 |
| 3,286,031 | 11/1966 | Geddes | 179/1 |
| 3,444,646 | 5/1969 | Domashovetz | 46/244 |
| 3,458,950 | 8/1969 | Tomaro | 46/243 |
| 3,688,126 | 8/1972 | Klein | 307/116 |
| 3,696,421 | 10/1972 | Bitler | 343/6.5 R |
| 3,725,602 | 4/1973 | Hoffman | 179/90 R |
| 3,742,143 | 6/1973 | Awipi | 179/1 SA |
| 3,961,441 | 6/1976 | Sato | 46/256 |
| 4,057,805 | 11/1977 | Dowling | 343/225 |
| 4,075,961 | 2/1978 | Harris | 112/219 A |
| 4,144,582 | 3/1979 | Hyatt | 364/900 |
| 4,189,779 | 2/1980 | Brautingham | 364/718 |
| 4,209,836 | 6/1980 | Wiggins, Jr. et al. | 364/718 |
| 4,234,761 | 11/1980 | Wiggins, Jr. et al. | 179/1 SM |
| 4,239,936 | 12/1980 | Sakoe | 179/1 SD |
| 4,356,545 | 10/1982 | West | 179/2 DP |

OTHER PUBLICATIONS

"Success in the Quest for Machines that Talk . . . and Listen", Popular Science, Aug. 1980, at pp. 54–59 and 116.

Sales Literature, Threshold Corporation.
"Speech-Synthesis Chip Borrows Human Intonation", Electronics, Apr. 10, 1980, pp. 113–118.
"Voice Input and Output", Electronic Design News, Nov. 20, 1979, pp. 159–167.
"Speech I/O is Making Itself Heard", Electronics, May 22, 1980, pp. 95–105.

Primary Examiner—E. S. Matt Kemeny
Attorney, Agent, or Firm—Quarles & Brady

[57] ABSTRACT

A voice actuated control system suitable for use on a computer numerically controlled (CNC) machine tool includes a pair of radio frequency transmitters and a pair of radio frequency receivers, one of the radio frequency receivers and one of the radio frequency transmitters being located at the machine tool site and the other radio frequency receiver and radio frequency transmitter being carried by the human machine tool operator. Operator-spoken commands are transmitted through the operator's transmitter to the machine tool receiver which outputs an audio signal to a voice interpreter that converts the received voice commands into digital signals which are transmitted to the CNC machine tool control system to control machine tool operation. Digital signals generated by the CNC machine tool control system, either in response to received operator commands or in accordance with variations in machine tool operating conditions, are converted by a speech synthesizer into synthesized audio signals representing speech phrases indicative of machine tool operation conditions. The speech synthesizer audio signals are transmitted to the operator to audibly inform him or her that the previously transmitted voice commands have been received or that further instructions are required.

11 Claims, 5 Drawing Figures

FIG. 1

VOICE ACTUATED MACHINE CONTROL

BACKGROUND OF THE INVENTION

This invention relates generally to control systems suitable for controlling a machine tool, and more specifically to a voice actuated machine tool control system which establishes two way voice communication between a human operator and the machine tool.

Conventional manually operated milling and boring machines are quickly being superseded by sophisticated horizontal and vertical spindle computer numerically controlled machine tools which typically employ a computer for regulating machine tool spindle and table movement and other machine tool functions such as coolant, spindle speed, etc. in accordance with preprogrammed commands stored in the computer memory. While computer numerically controlled machine tools have greatly automated performance of machining operations on a workpiece, such machines have still not completely eliminated the need for human supervision. In the course of operation of a computer numerically controlled machine tool, it may be necessary to measure a particular workpiece dimension, to replace a broken or worn tool or to make a change in the program controlling machine tool operation. Further, should an abnormal machine tool condition arise, it may be necessary for the human operator to interrupt machine tool operation so as to prevent serious machine tool damage.

Presently, operator commands to alter or to completely stop machine tool operation are typically entered to the machine tool control system through a keyboard on the front panel of the control system enclosure or through a remote control unit coupled to the control system through a cable. While entry of operator commands through either the keyboard or through the remote control unit coupled to the control system has proven satisfactory for the most part, the fixed position of the keyboard on the front panel of the control system enclosure and the length and bulk of the cable linking the remote control unit to the control system limits operator mobility. A further disadvantage of such present day machine tool control systems is that the speed at which operator commands are manually entered to the machine tool control system through the machine tool control system keyboard or through the remote control unit is dependent on the operator's reflexes. In the event that an emergency machine tool condition occurs when the operator is not able to quickly actuate the keyboard or remote control unit, such failure to actuate keyboard or the remote control in a timely manner may result in serious operator injury and extensive damage to the machine tool.

The present invention concerns a voice actuated machine tool control system which provides fast response to operator commands yet does not limit operator mobility.

It is an object of the present invention to provide a control system for a machine tool which is responsive to voice commands spoken by a human operator.

It is another object of the present invention to provide a control system for a machine tool in which there is two-way voice communication between the machine tool and the machine tool operator.

It is yet another object of the present invention to provide a control system for a machine tool in which operator commands are transmitted to the machine tool control system by radio frequency signals.

BRIEF SUMMARY OF THE INVENTION

Briefly, in accordance with the preferred embodiment of the invention, apparatus for controlling a computer controlled system, such as a computer numerically controlled (CNC) machine tool, in accordance with voice commands spoken by a human operator, comprises a first and second radio frequency transmitter and receiver pairs; one transmitter-receiver pair being located at the site of the machine tool, and the other transmitter-receiver pair being carried by the operator. The radio transmitter carried by the operator continuously transmits a radio frequency carrier signal and during intervals when operator-spoken voice commands are to be transmitted to the machine tool control system, the operator's radio frequency transmitter superimposes on the radio frequency carrier signal a voice modulated signal varying in accordance with operator-spoken commands entered to the transmitter through the operator's microphone. The receiver at the machine tool site is tuned to receive the radio frequency carrier signal transmitted from the operator's transmitter and during intervals when there is a voice-modulated signal superimposed on the radio frequency carrier signal as will be the case when the operator transmits voiced commands to the machine tool, the receiver at machine tool site demodulates the voice-modulated signal to produce an audio signal varying accordingly. A voice interpreter, typically under the control of the machine tool control system, converts audio signals received from the machine tool receiver into a digital signal which is then supplied to the machine tool control system to vary the operation thereof accordingly. In response to the digital signals received from the voice interpreter, or in response to changes in machine tool operating conditions, the machine tool control system generates digital signals which are supplied to a voice emulator. The voice emulator converts the digital signal generated by the machine tool control system into synthesized audio signals, representing speech phrases which are indicative of machine tool operating conditions. The audio signals produced by the voice emulator are supplied to the radio frequency transmitter at the machine tool site for superimposition on the radio frequency carrier signal continuously transmitted by the machine tool radio frequency transmitter. The voice modulated radio frequency signals transmitted by the machine tool transmitter are received and demodulated by the operator's receiver to provide audio signals which are converted by the operator's earphone into audible speech phrases representing machine tool operating conditions.

The radio frequency carrier signal continuously transmitted by each of the radio frequency transmitters carried by the operator and radio frequency transmitter located at the machine tool site serves as a "hand-holding" link between the transmitter and its associated receiver. If no radio frequency carrier signal is transmitted by the operator's radio frequency transmitter or if the radio frequency carrier signal transmitted thereby is not received by the machine tool receiver, then the machine tool control system initiates an emergency machine tool stop condition. Should no radio frequency carrier signal be received by the operator's receiver from the machine tool radio frequency transmitter, then a hand-holding logic circuit coupled to the operator's receiver and earphone causes a warning tone to be transmitted to the operator. In this way, if the machine tool can no longer receive commands from the operator, the machine will not run unattended and if the operator no longer receives information concerning machine tool operating conditions, he or she is alerted to this condition.

BRIEF DESCRIPTION OF THE DRAWINGS

The features of the invention believed to be novel are set forth with particularity in the appended claims. The invention itself, however, both as to organization and method of operation, together with further objects and advantages thereof may best be understood by reference to the following description taken in conjunction with the accompanying drawings in which:

DETAILED DESCRIPTION OF THE PREFERRED EMBODIMENT

Figure 1:
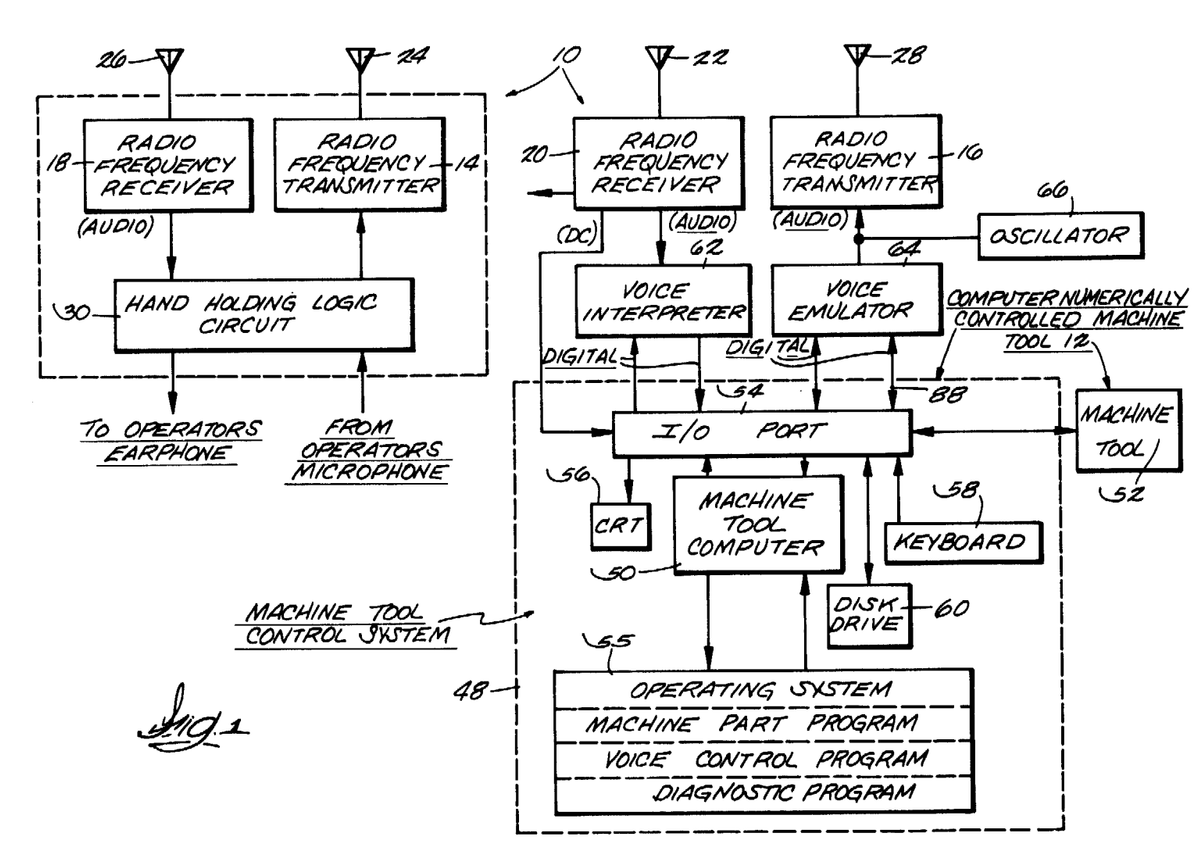
FIG. 1 is a block diagram of the voice actuated controller in accordance with the teachings of the present invention.

FIG. 1 illustrates, in block form, a voice actuated controller 10 for controlling the operation of a computer controlled system, such as a computer numerically controlled (CNC) machine tool 12. Voice actuated controller 10 comprises a pair of radio frequency transmitters 14 and 16 and a pair of radio frequency receivers 18 and 20, respectively. Radio frequency transmitter 14 (which is carried by the machine tool operator, as will become better understood by reference to FIG. 2) and radio frequency receiver 20, which is located at the site of CNC machine tool 12, are each tuned to the same frequency, enabling radio frequency receiver 20 to receive, through an antenna 22 coupled to the receiver, radio frequency signals transmitted thereto by transmitter 14 through an antenna 24 coupled to the transmitter. Radio frequency transmitter 16, which is typically located at the site of machine tool 12, and radio frequency receiver 18, which is typically carried by the operator along with transmitter 14, are each tuned to the same frequency, which frequency, is different from the frequency to which radio frequency transmitter 14 and radio frequency receiver 20 are tuned. In this way, radio receiver 18 is able to receive, through an antenna 26, radio frequency signals which are transmitted by radio frequency transmitter 16 through an antenna 28 during the same interval transmitter 16 is transmitting radio frequency signals to receiver 14. Typically, antennas 24 and 26 each comprise an "arm" antenna (such as is described in NASA Publication ARC-11195), which are each worn on a separate one of the operator's arms, thereby avoiding directional effects due to attenuation of radio signals caused by operator movement relative to antennas 22 and 28, which each comprise conventional radio frequency antennas.

Radio frequency transmitter 14 and receiver 18 are interfaced by a hand-holding logic circuit 30 to the operator's earphone (not shown) and the operator's microphone (not shown). As will become better understood hereinafter by reference to FIG. 5, hand-holding logic circuit 30 does more than simply couple the operator's microphone to the audio input of radio transmitter 14 and couple the audio output of receiver 18 to the operator's earphone. Hand-holding logic circuit is operative to both generate a "hand-holding" signal for transmission by transmitter 14 to receiver 20 and is also operative to monitor a like hand-holding transmitted by transmitter 16. The hand-holding signals transmitted from each of transmitter 14 and 16, while received by a separate one of receivers 18 and 20, respectively, serve as an indication that each receiver is still receiving information from its corresponding transmitter.

Figure 2:
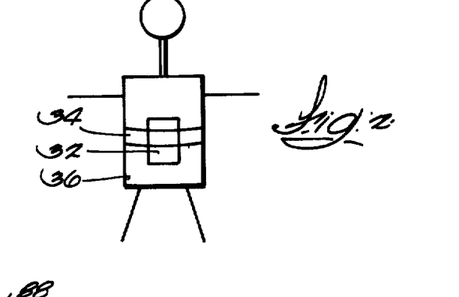
FIG. 2 illustrates how the machine tool operator carries one of the radio transmitter-receiver pairs comprising a portion of the voice actuated control illustrated in FIG. 1.
Figure 5:
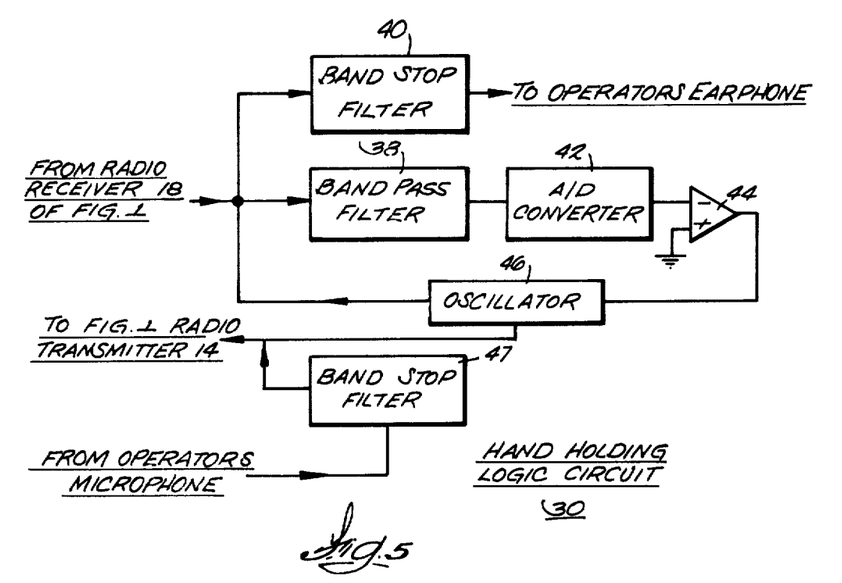
FIG. 5 is a block diagram of a hand-holding logic circuit comprising a portion of the voice actuated controller illustrated in FIG. 1.

Referring now to FIG. 2, radio transmitter 14 and radio receiver 18, together a hand-holding logic circuit 30 of FIG. 5, are housed in a single enclosure 32 fastened to a belt 34 which is worn by the operator 36. Typically, enclosure 32 is no larger than the size of a conventional commerically available handheld, radio frequency transceiver so that operator mobility remains unimpaired while belt 34 is fastened about the waist of operator 36.

Referring back to FIG. 1, in practice, each of radio transmitter 14 and 16 is operative to transmit and each of radio frequency receivers 18 and 20 is operative to receive frequency modulated (FM) radio signals in the high frequency (HF) to very high frequency (VHF) range. Alternatively, radio frequency transmitters 14 and 16 and radio frequency receivers 18 and 20 could be constructed to transmit and receive, respectively, amplitude modulated (AM) or digitally modulated (DM) radio signals. In fact, each of the transmitters and each of the receivers could be constructed to transmit and receive, respectively, ultrasonic or light waves rather than radio frequency waves. As a practical matter, communication between the operator and the machine tool via radio frequency waves is preferable since communication via high frequency or very high frequency radio waves does not require that the receiver be in the direct line of sight of the transmitter as would be required with light wave communication. Further, radio frequency waves are less susceptible to interference from the severe environmental conditions under which CNC machine tools usually operate than are ultrasonic waves.

Referring now to FIG. 5 there are shown the details of hand-holding logic circuit 30. Hand-holding logic circuit 30 comprises a band pass filter 38 and a band stop filter 40 which are each supplied at their respective inputs with audio signals from receiver 18, (FIG. 1), representing information indicative of machine tool operating conditions, transmitted by transmitter 16 (FIG. 1). In practice, the information transmitted by transmitter 16 consists of a continuous wave radio frequency carrier signal on which is superimposed voice-modulated radio frequency signals which vary in accordance with synthesized audio signals representing speech phrases indicative of machine tool operation. Band stop filter 40 filters out the single frequency audio signal, corresponding to the single frequency signal carrier transmitted by transmitter 16, to supply the operator's earphone with the audible information indicative of machine tool operation. In this manner, the operator is audibly apprised about machine tool operating conditions.

In contrast to band stop filter 40, band pass filter 38 passes to an analog to digital converter 42 only the single frequency audio signal, corresponding to the single radio frequency carrier signal transmitted by transmitter 16. The output signal of A/D converter 42 is supplied to the first input of comparator 44 whose second input is coupled to circuit ground. During intervals while radio receiver 18 of FIG. 1 receives the single frequency carrier signal from transmitter 16 (FIG. 1), A/D converter 42 outputs a digital signal at a binary "1" amplitude to an oscillator 46, thereby causing oscillator 46 to generate a single frequency signal at a first output which is coupled to the audio input of transmitter 14. To prevent the oscillator output signal from being transmitted to the operator's microphone, a band stop filter 47, configured identically to band stop filter 40, is interposed between the first output of the oscillator and the operator's microphone.

Should radio receiver 18 of FIG. 1 fail to receive the carrier signal transmitted by transmitter 16 of FIG. 1, as will be the case if radio frequency receiver 18 becomes inoperative or if receiver 18 is transported by operator 36 (FIG. 2) beyond the transmission range of transmitter 16, then the output signal amplitude of A/D converter 42 changes to a binary "0", causing the output signal amplitude of comparator 44 to change to a binary "0". When the output signal of comparator 44 changes to a binary "0" amplitude, oscillator 46 generates a dual tone, or siren signal at the second output of the oscillator. A portion of this signal passes through band stop filter 40 to the operator's earphone. The pulsating single frequency signal thus alerts the operator that communication with CNC machine tool 12 (FIG. 1) has been interrupted and that appropriate action should be taken.

As indicated, during intervals while receiver 18 receives the single radio frequency carrier or "hand-holding" signal transmitted by transmitter 16 (both of FIG. 1), oscillator 46 generates a single frequency audio signal. This signal is supplied to the audio input of transmitter 14 (FIG. 1). When supplied with the single frequency audio signal from oscillator 46, transmitter 14 transmits to receiver 20, (FIG. 1) the continuous wave radio frequency carrier signal which is monitored by receiver 20 in the same manner in which the radio frequency carrier signal transmitted by radio frequency transmitter 16 is monitored by receiver 18. During intervals when voice commands from the operator are being spoken into the operator's microphone, the audio signals from the operator's microphone are superimposed on the audio frequency signal generated by oscillator 46 and the combined signal is supplied to the input of transmitter 14. Accordingly, the transmitter superimposes on the radio frequency carrier signal, a corresponding voice modulated radio frequency signal for transmission to receiver 20 (FIG. 1).

Referring back to FIG. 1, radio receiver 20 monitors the radio frequency carrier signal transmitted by radio frequency transmitter 14 and the receiver produces a digital output signal whose amplitude is either a binary "1" or a binary "0" depending on whether or not the receiver receives the radio frequency carrier signal transmitted by transmitter 14. During intervals when transmitter 14 transmits voice modulated radio frequency signals (representing operator spoken commands) to receiver 20, radio frequency receiver 20 is further operative to demodulate the voice-modulated signals to produce an audio signal which varies accordingly. The digital signal produced by receiver 20, which vares in amplitude in accordance with presence or absence of a received radio frequency carrier signal from transmitter 14, is supplied directly to the control system 48 of CNC machine tool 12. Typically, machine tool control system 48 comprises a computer 50 which is interfaced to a numerically controlled machine tool 52 through an I/O port 54. Computer 50 serves as the master controller for machine tool 50 for controlling machine tool operation in accordance with the machine part programs stored in a memory 55 linked to the computer. I/O port 54 also couples computer 50 to a cathode ray tube (CRT) display 56 and to a keyboard 58 which are both mounted on an outward facing surface of the machine tool control system enclosure (not shown). Display 56 displays data indicative of machine tool operating conditions to visually apprise the operator of machine tool operating conditions so as to prompt the operator to enter appropriate commands through keyboard 58 or through the operator's microphone.

Memory 55, in addition to containing one or more machine part programs, also contains three other programs, one of which is an operating system or an executive program which is executed by computer 50 to control the execution of machine part program as well as the two remaining programs which consist of a diagnostic program that enables the CNC machine tool to communicate with an off-site diagnostic computer in the manner described in U.S. Pat. No. 3,882,305 issued to Richard Johnstone on May 6, 1975, and a voice control program. It is the voice control program which enables computer 50 to respond to voice commands spoken by the operator and transmitted to the machine tool by transmitter 14 (FIG. 2) and which enables the computer to communicate with the operator by synthesizing audio signals representing speech phrases indicative of machine tool operating conditions. Memory 55 is supplemented by a disk drive 60 coupled through I/O port 54 to computer 60. Typically, disk drive 60 stores additional machine part programs.

During intervals while the voice control program stored in memory 55 is being executed by computer 50, the digital signal produced by receiver 20 and inputted to computer 50 through I/O port 54 is continuously monitored by the machine tool computer to determine whether the operator is still in communication with the machine tool. Should the amplitude of the receiver digital output signal deviate from a binary "1" to a binary "0", indicating an interruption in receipt of the radio carrier signal from transmitter 14, then machine tool computer 50 commands an emergency stop of the machine tool 52. This assures that during intervals when the operator is not otherwise in communication with the machine tool control system, that the machine tool ceases to operate. Otherwise, while the amplitude of the digital signal produced by receiver 20 remains at a binary "1" amplitude machine tool 52 remains operational to execute machine tool instructions from computer 50.

As indicated earlier, while receiver 20 receives a voice-modulated radio frequency signal (corresponding to an operator-spoken command) superimposed on the radio frequency carrier signal transmitted by radio frequency transmitter 14, receiver 20 demodulates the voice modulated radio frequency signal to produce an audio signal that varies accordingly. The audio signal produced by receiver 20 is supplied to the input of a voice interpreter 62 which is typically comprised of a model 102 voice recognition module manufactured by Interstate Electronic Corporation, Anaheim, Calif. As will be described in greater detail hereinafter with respect to FIG. 4, voice interpreter 62, in response to commands from computer 50 as received therefrom through I/O port 54, translates the audio signals from receiver 20 representing the operator spoken commands into digital signals. The digital signals produced by voice interpreter 62 are transmitted through I/O port 54 to computer 50 which, in response alters the operation of machine tool 52 accordingly.

Information indicative of machine tool operating conditions, which takes the form of digital signals, is generated by computer 50, either in response to the digital signals received from voice interpreter 62 or in accordance with abnormalities in machine tool operation or both. The digital signals generated by computer 50 are transmitted from the machine tool computer through I/O port 54 to a voice emulator 64 coupled thereto. Voice emulator 64 (described in greater detail with respect to FIG. 3) is controlled by computer 50 and in response to digital signals received from computer 50, voice emulator 64 translates such digital signals into synthesized audio signals representing speech phrases which correspond to the machine tool operating conditions. The audio signals generated by voice emulator 64 together with the single audio signal produced by an oscillator 66 are supplied to the audio input of radio frequency transmitter 16. In accordance with the single frequency audio signal received from oscillator 66, radio frequency transmitter 16 generates a continuous wave radio frequency carrier signal. During intervals when voice emulator 64 outputs audio signals which represent speech phrases indicative to machine tool operating conditions, radio frequency transmitter 16 superimposes a voice modulated radio frequency signal, varying in accordance with the audio signals supplied from voice emulator 64, on the radio frequency carrier signal for transmission to receiver 18.

The radio frequency carrier signal transmitted by transmitter 16 in accordance with the audio output signal of oscillator 66 and received by receiver 18 serves as a "hand-holding" signal to assure a continuous communication link between transmitter 16 and receiver 18 in exactly the same manner by which the carrier signal transmitted by transmitter 14, serves as a hand-holding link between transmitter 14 and receiver 20. As indicated earlier, should receiver 20 fail to receive a carrier signal from transmitter 14, then the operator receives an error signal in his or her earphone to apprise him or her of an interruption in communication with the machine tool control system.

Figure 4:
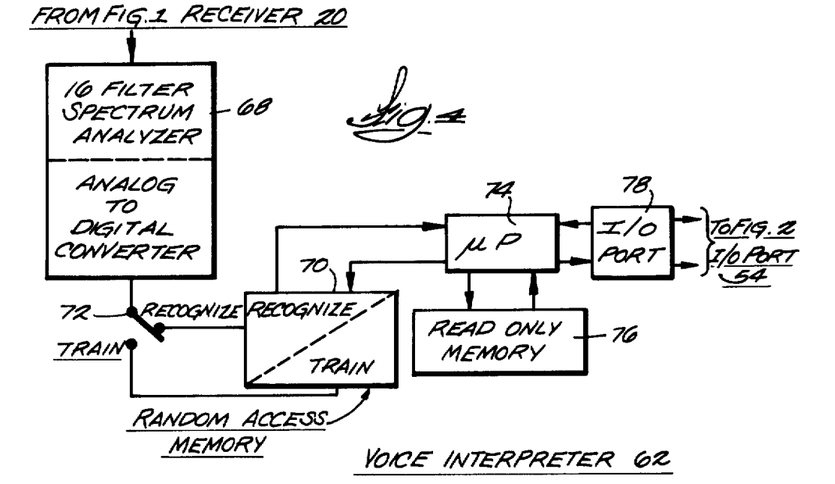
FIG. 4 is a block diagram of the voice interpreter comprising a portion of the voice actuated controller illustrated in FIG. 1.

Referring now to FIG. 4, there is shown the details of voice interpreter 62. Voice interpreter 62 comprises a combined 16 filter spectrum analyzer and analog-to-digital converter 68 which filters and digitizes the audio signals supplied from receiver 20 to yield a digital signal, typically 8 bits in length, which is passed through a switch 72 to a random access memory (RAM) 70 for storage thereat in one of two memory areas depending on whether switch 72 is at the "recognize" or "train" position. Since human speech characteristics such as pitch, frequency and format, to name a few, vary from individual to individual, it is necessary to first train voice interpreter 62 to recognize a particular individual's speech. As will become better understood hereinafter, this is readily accomplished by placing switch 72 in the "train" position so that digital signals, representative of a particular word spoken by the operator, are to be stored in RAM 70 in a first memory area for comparison against subsequently generated digital signals, representing a command subsequently spoken by the operator, which are stored in the remaining memory area in RAM 70 when switch 72 is in the "recognize" position.

Comparison of the digital signals stored in random access memory 70, when switch 72 is in the "train" position, with digital signals stored in random access memory (RAM) 70 when switch 72 is in the "recognize" position, is accomplished by a microprocessor 74 which is coupled to RAM 70. Microprocessor 74 is also coupled to a read only memory (ROM) 76 which stores a plurality of digital commands, each digital command corresponding to a separate one of the set of possible machine tool commands. An I/O port 78 is coupled to microprocessor 74 and interfaces microprocessor 74 to I/O port 54 (FIG. 1) of machine tool control system 48 (FIG. 1) to permit commands from machine tool control system computer 50 (FIG. 1) to be received by microprocessor 74 and digital signals generated by microprocessor 74, which are representative of operator-spoken commands received by receiver 20 (FIG. 1) to be supplied to computer 50.

As alluded to earlier, before voice interpreter 62 can translate the operator spoken voice commands into digital signals which are readily recognizable by the machine tool computer, it is necessary to train the voice interpreter to recognize the operator's spoken commands. This is accomplished when switch 72 is placed in the "train" position by having the operator speak all the possible commands into his or her microphone so that the digital representation of each operator spoken command can be stored in random access memory 70 of the voice interpreter for comparison against subsequently received operator-spoken commands. Each of the operator-spoken voice commands entered to the voice interpreter during the interval that switch 73 is in the "train" position is preselected so as to correspond to a separate one of the digital signals stored in read only memory 76 which each represent the electrical signal equivalent of a separate one of the possible machine tool control system commands.

Once voice interpreter 62 has been "trained", that is to say, that the digital representation of each of the possible operator-spoken voice commands have been entered into the voice interpreter random access memory, then the voice interpreter is operative, while switch 72 is in the "recognize" position, to translate subsequently spoken operator commands received by the voice interpreter into digital information by undertaking a bit by bit comparison of the digital signal representing the subsequently entered operator command against each bit of the previously stored digital signal representations of each of the operator spoken commands entered into RAM 70 during intervals while switch 72 was in the "train" position. This bit by bit comparison is performed by microprocessor 74. Once a match between all or most of the digital bits of the signal representing the subsequently received operator spoken command with one of the digital signals previously entered to the voice interpreter while switch 72 was in the "train" position is found, indicating that microprocessor 74 has matched the subsequently received operator-spoken voice command with a specific one of the previously received operator spoken voice commands, then microprocessor 74 retrieves the digital signals stored in ROM 76 representing the machine tool command corresponding to the subsequently received operator spoken voice command. The digital signal retrieved from ROM 76 is then transmitted to machine tool computer 50 to alter the operation thereof accordingly. The above-described voice interpretator is only one example of the various voice interpreting circuits now available. Those skilled in the art will appreciate that other voice interpretation circuits could be employed as well.

Figure 3:
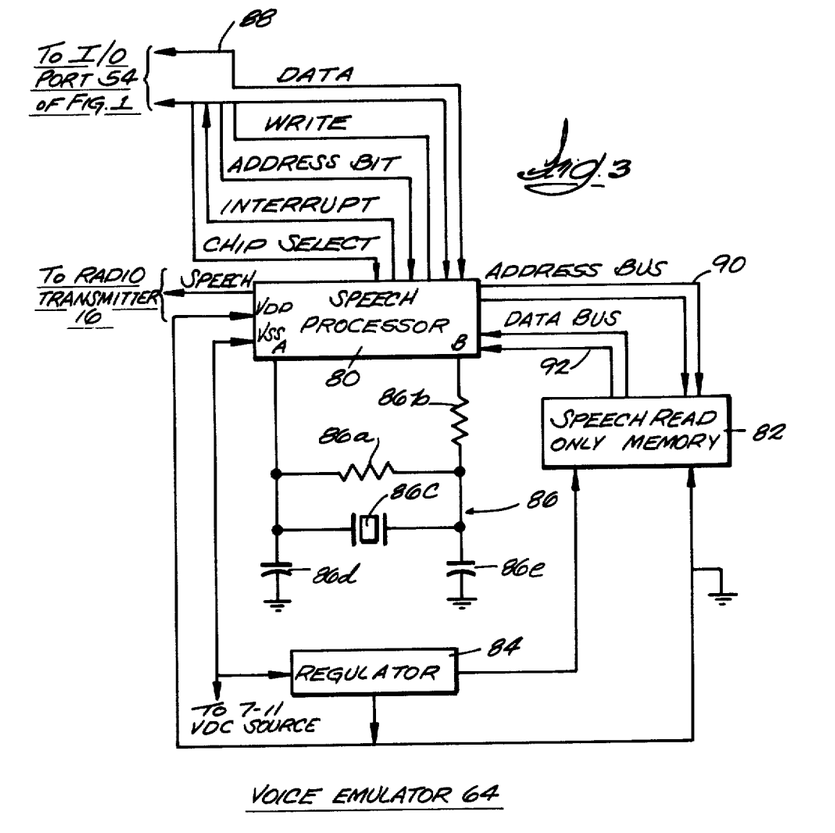
FIG. 3 is a part-block, part-schematic diagram of the voice emulator comprising a portion of the voice actuated controller illustrated in FIG. 1.

The details of voice emulator 64 are illustrated in FIG. 3. In the presently preferred embodiment, voice emulator 64 includes a National Semiconductor Model DT-1050 speech synthesizer chip set which comprises a speech processor 80 and a speech read only memory 82 (ROM) which stores a plurality of digital words, each representing a synthesized speech pattern which corresponds to a particular machine tool operating condition. Speech processor 80 is excited from a 7-11 d.c. voltage source with a voltage $V_{ss}$ and is excited with a 5 volt d.c. voltage $V_{dd}$ from a regulator 84 which is coupled at its input to the same 7-11 volt d.c. voltage that supplies speech processor 80 with voltage $V_{ss}$. Regulator 84 also supplies speech ROM 82 with a pair of regulated 5 volt d.c. voltages.

An oscillator 86 is coupled to speech processor 80 at speech processor input terminals A and B and supplies periodic timing signals to regulate the operation of speech processor 80. Oscillator circuit 86 comprises a pair of resistors 86a and 86b, respectively, which are serially coupled across terminal A and B of the speech processor. Coupled across resistor 86a is a crystal 86c which regulates the frequency of the oscillator circuit. A pair of capacitances 86d and 86e each couple a separate one of the two terminals of crystal 86c to circuit ground. Typical values of each of the above-described components of oscillator circuit 86 are given below.

| RESISTOR | 86a | 1.5M |
|---|---|---|
| RESISTOR | 86b | 1.5K |
| CRYSTAL | 86c | 4MHz |
| CAPACITOR | 86d | 20pf |
| CAPACITOR | 86e | 50pf |

In an operation, when voice commands are to be transmitted to the operator to audibly apprise the operator of machine tool operating conditions either in response to an operator-spoken voice command received through the speech interpreter or the response to a change in machine tool operating conditions, computer 50 (FIG. 1) under command of the voice control program stored in memory 55 (FIG. 1) transmits a chip select signal across bi-directional data bus 88 to speech processor 80 to alert the speech processor that data, in the form of digital signals indicative of the address location of the stored digital words representing the synthesised speed patterns corresponding to the particular then-occurring machine tool operating condition, will be forthcoming. Thereafter, computer 50 transmits the selected address to speech processor 80 and, upon receipt of the address data from computer 50, speech processor 80 transmits the selected address along address bus 90 to speech ROM 82. In response, speech ROM 82 transmits to speech processor 80 across data bus 92, the digital words stored at the addresses previously received from the speech processor via address bus 90. Following receipt of the digital words from speech ROM 82, speech processor 80 converts the digital words into audio signals and then transmits an interrupt to signify completion of this task. Upon receipt of a write signal from the machine tool control system, speech processor 80 supplies the audio signals to transmitter 16 for subsequent transmission to the operator. For a further, more detailed understanding of the operation of speech processor 80, reference should be had to the article "Speech-Synthesis Chip Borrows Human Intonation" on pages 113-180 of the Apr. 10, 1980 edition of *Electronics*. Although voice emulator 64 has been described in particular detail, those skilled in the art will recognize that other speech synthesis circuits could easily be employed.

The foregoing describes a voice actuated controller for transmitting commands to the computer controlled system to control the operation thereof in accordance with voice commands spoken by an operator and for transmitting to the operator speech phrases indicative of the operation of the computer controlled system.

Although the illustrative embodiment of the invention has been in considerable detail for the purpose of fully disclosing a practical operative structure incorporating the invention, it is to be understood that the particular apparatus shown and described is intended to be illustrative only and that various novel features of the invention may be incorporated in other structural forms without departing from the spirit and scope of the invention as defined in the subjoined claims.

The principles of this invention now having been explained in connection with the foregoing, we hereby claim as our invention:

1. Apparatus for enabling a human operator to control the operation of a computer controlled system in accordance with voice commands and to receive audible information therefrom indicative of computer controlled system operating conditions comprising:

first transmitting means for transmitting a carrier signal, and for transmitting operator spoken commands by modulating said carrier signal, to control the operation of the computer controlled system;

first receiving means for receiving said operator-spoken commands transmitted by said first transmitting means to produce an audio signal which varies accordingly and said first receiving means being responsive to the absence of said carrier signals from said first transmitting means and in the absence of said carrier signals from said first transmitting means, said first receiving means supplying an output signal to the computer controlled system to cause the computer controlled system to cease operation;

voice interpreter means coupled to said first receiving means for converting said audio signals supplied from said first receiving means into digital signals which are supplied to the computer controlled system to control the operation thereof;

voice synthesizer means adapted to receive digital signals generated by the computer controlled system in response to digital signals supplied to the computer controlled system from said voice interpreter means and in response to deviations of computer controlled system operation, said voice synthesizer means translating the digital signals supplied from the computer controlled system into audio signals corresponding to synthesized speech phrases indicative computer controlled system operating conditions;

second transmitter means coupled to said voice synthesizer means for transmitting signals varying in accordance with said audio signal received from said voice synthesizer means; and second receiver means for receiving said signals transmitted from said second transmitter means to provide the operator with audible information in the form of speech phrases indicative of the operating conditions of the computer controlled system.

2. The invention according to claim 2 wherein:

said first transmitting means transmits a continuous wave carrier signal and during intervals when operator-spoken commands are entered to said first transmitting means, said first transmitting means superimposes on said carrier signal a voice modulated signal varying in accordance with said operator-spoken commands; and said second transmitting means transmits a continuous wave carrier signal and, during intervals when said voice synthesizer means produces an audio signal indicative of the operating conditions of said computer controlled system, said second transmitting means superimposing on said carrier signal, a voice modulated signal varying in accordance with said voice synthesizer signal.

3. The invention according to claim 2 further including hand-holding logic circuit means coupled to said second receiver means for alerting said operator when said second receiver means is not receiving said carrier signal transmitted by said second transmitter means.

4. The apparatus according to claim 3 wherein said first transmitter means, said second receiver means and said hand-holding logic circuit means are all carried by the operator.

5. The apparatus according to claim 4 further including:

a belt adapted to be worn by the operator; and an enclosure fastened to said belt for housing said first transmitting means, said second receiving means and said hand-holding logic circuit means.

6. The apparatus according to claim 3 wherein said hand-holding logic circuit means comprises:

circuit means coupled to said second receiver means for generating a digital output signal whose amplitude deviates from a first to a second level when said second receiver means fails to receive said carrier signal transmitted from said second radio frequency transmitter means;

comparator means having a first input coupled to said circuit means to receive said digital output signal therefrom and having a second input coupled to circuit ground, said comparator means generating an output signal whose voltage magnitude deviates from a first to a second level when said circuit means output signal deviates from a first to a second level; and oscillator means coupled to said comparator means for generating an audio warning signal when said comparator output voltage deviates from a first to a second magnitude.

7. For use with a computer numerically controlled (CNC) machine tool comprised of a numerically controlled (N/C) machine tool which is controlled by a machine tool control system, apparatus for enabling a human operator distal from said CNC machine tool to be audibly apprised of the machine tool operating conditions and for enabling said human operator to control the operation of said CNC machine tool by voice commands, said apparatus comprising:

first radio frequency transmitter means for transmitting a continuous wave radio frequency carrier signal and for superimposing on said carrier signal a voice modulated radio frequency signal representing operator-spoken voice machine tool commands;

first radio frequency receiver means for receiving said carrier signal from said first radio frequency transmitter means and for alerting said machine tool control system of an interruption in the receipt of said carrier signal by said first radio frequency receiver means so as to enable said machine tool control system to effect an emergency stop of said N/C machine tool when an interruption occurs in receipt of said carrier signal, said first radio frequency receiver means receiving and demodulating said voice modulated radio frequency signal superimposed on said carrier to produce an audio signal which varies accordingly;

voice interpreter means coupled to said first radio frequency receiver means for converting said audio signals supplied therefrom into digital signals which are supplied to said machine tool control system to control the operation of said N/C machine tool;

voice synthesizer means coupled to said machine tool control system for converting digital signals generated by said machine tool control system in response to digital signals received from said voice interpreter means and in response to changes in machine tool operating conditions, into synthesized audio signals representing speech phrases which are indicative of machine tool operating conditions;

second radio frequency transmitter means coupled to said voice synthesizer means for transmitting a continuous wave radio frequency carrier signal and for superimposing on said carrier signal a voice modulated radio frequency signal varying in accordance with said audio signals received from said voice synthesizer means; and second radio frequency receiver means for receiving said carrier signal transmitter by said second radio frequency transmitter means and for receiving and demodulating said voice modulated signals sperimposed on said carrier signal transmitted by said second radio frequency transmitter means to provide audible information to the operator indicative of machine tool operating conditions.

8. The invention according to claim 7 further including hand-holding logic circuit means coupled to said second radio frequency receiver means for alerting the operator of an interruption in receipt of said carrier signal by said second radio frequency receiver means.

9. The invention according to claim 7 wherein said first radio frequency transmitter means, said second radio frequency receiver means and said hand-holding logic circuit means are all carried by said operator.

10. The invention according to claim 7 further including:

a belt adapted to be worn by said operator; and an enclosure fastened to said belt for enclosing said first radio frequency transmitter means, said second radio frequency receiver means and said hand-holding logic circuit means.

11. The invention according to claim 5 wherein said hand-holding logic circuit means comprises:
   circuit means coupled to said second radio frequency receiver means for generating a digital signal whose amplitude deviates from a first to a second level when an interruption in receipt of said carrier signal by said second radio receiver means occurs;
   comparator means having a first input coupled to said circuit means to receive the digital signal generated thereby, and having a second input coupled to circuit ground, said comparator means generating a digital signal whose amplitude deviates from a first to a second level when said circuit means output signal deviates from a first to a second level; and
   oscillator means coupled to said comparator means for providing said operator with a warning signal when said comparator means output signal deviates from a first to a second level.

* * * * *

UNITED STATES PATENT AND TRADEMARK OFFICE
CERTIFICATE OF CORRECTION

PATENT NO. : 4,462,080
DATED : July 24, 1984
INVENTOR(S) : Richard Johnstone, et al.

It is certified that error appears in the above—identified patent and that said Letters Patent is hereby corrected as shown below:

IN THE ABSTRACT:

Lines 20-21, "operation" should be --operating--.

Col. 4, line 21, after "together" insert --with--.
Col. 6, line 3, "vares" should be --varies--.
Col. 9, line 56, "speed" should be --speech--.
Col. 10, line 46, "signals" should be --signal--.
Col. 10, line 47, "signals" should be --signal--.

Col. 11, line 10, "claim 2" should be --claim 1--.
Col. 12, line 46, "transmitter" should be --transmitted--.

Signed and Sealed this

Sixteenth Day of April 1985

[SEAL]

Attest:

DONALD J. QUIGG

Attesting Officer    Acting Commissioner of Patents and Trademarks